United States Patent
Nakamura et al.

(10) Patent No.: US 8,346,473 B2
(45) Date of Patent: Jan. 1, 2013

(54) LANE DETERMINING DEVICE, LANE DETERMINING METHOD AND NAVIGATION APPARATUS USING THE SAME

(75) Inventors: Masaki Nakamura, Okazaki Aichi (JP); Tomoaki Ishikawa, Okazaki Aichi (JP); Koichi Nakao, Okazaki Aichi (JP); Osamu Aisaka, Okazaki Aichi (JP); Motoki Kanba, Okazaki Aichi (JP); Kiyokazu Okada, Aichi-ken (JP)

(73) Assignees: Aisin AW Co., Ltd., Anjo-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 621 days.

(21) Appl. No.: 12/593,772

(22) PCT Filed: May 23, 2008

(86) PCT No.: PCT/JP2008/059961
§ 371 (c)(1), (2), (4) Date: Sep. 29, 2009

(87) PCT Pub. No.: WO2008/146899
PCT Pub. Date: Dec. 4, 2008

(65) Prior Publication Data
US 2010/0121569 A1 May 13, 2010

(30) Foreign Application Priority Data
May 25, 2007 (JP) .................... 2007-139733

(51) Int. Cl.
*G01C 21/32* (2006.01)
(52) U.S. Cl. .......... 701/409; 701/532; 701/28; 340/937
(58) Field of Classification Search .......... 701/409, 701/1, 301, 300, 117, 28, 96, 532; 340/937, 340/933
See application file for complete search history.

(56) References Cited

U.S. PATENT DOCUMENTS

| | | | |
|---|---|---|---|
| 2001/0056326 A1* | 12/2001 | Kimura | 701/208 |
| 2007/0021912 A1 | 1/2007 | Morita et al. | 701/211 |
| 2007/0041614 A1 | 2/2007 | Tanji | 381/104 |

FOREIGN PATENT DOCUMENTS

| | | |
|---|---|---|
| JP | 2002-318130 | 10/2002 |
| JP | 2006-162409 | 6/2006 |

OTHER PUBLICATIONS

Abstract of U. Franke et al., "Steps towards an intelligent vision system for driver assistance in urban traffic", Nov. 9, 1997, pp. 601-606, Intelligent Transportation System, 1997, ITSC '97, IEEE Conference on.

* cited by examiner

*Primary Examiner* — Thomas Black
*Assistant Examiner* — Luke Huynh
(74) *Attorney, Agent, or Firm* — Bacon & Thomas, PLLC

(57) ABSTRACT

A lane determining device includes: a feature information obtaining unit for obtaining feature information F of a target feature existing in each lane in the traveling direction of a vehicle 30, based on vehicle position information; an image recognizing unit for conducting image recognition processing of a feature type of the target feature in a vehicle lane, with respect to image information; and a lane accuracy determining unit for determining a vehicle lane accuracy for the respective lanes based on a type of a recognized feature fa shown in an image recognition result, feature types Ft1 to Ft4 of the target feature of the respective lanes shown in the feature information F, in accordance with a level of probability for each of the feature types Ft1 to Ft4 of the target feature of the respective lanes is recognized as the type of the recognized feature fa.

18 Claims, 8 Drawing Sheets

FIG. 4

| TYPE OF RECOGNIZED FEATURE | FEATURE TYPE CAPABLE OF BEING TARGET FEATURE |||||||||
|---|---|---|---|---|---|---|---|---|---|
| | | STRAIGHT-AHEAD | STRAIGHT-AHEAD/ RIGHT-TURN | STRAIGHT-AHEAD/ LEFT-TURN | RIGHT-TURN | LEFT-TURN | RIGHT/ LEFT-TURN | RIGHT-TURN TYPE 2 | LEFT-TURN TYPE 2 |
| STRAIGHT-AHEAD | ⬅ | 2 | 1 | 1 | 0 | 0 | 0 | 0 | 0 |
| STRAIGHT-AHEAD/ RIGHT-TURN | | 1 | 2 | 0 | 0 | 0 | 0 | 0 | 0 |
| STRAIGHT-AHEAD/ LEFT-TURN | | 1 | 0 | 2 | 0 | 0 | 0 | 0 | 0 |
| RIGHT-TURN | | 0 | 0 | 0 | 2 | 0 | 1 | 1 | 0 |
| LEFT-TURN | | 0 | 0 | 0 | 0 | 2 | 1 | 0 | 1 |
| RIGHT/ LEFT-TURN | | 0 | 0 | 0 | 1 | 1 | 2 | 0 | 0 |
| RIGHT-TURN TYPE 2 | | 0 | 0 | 0 | 1 | 0 | 0 | 2 | 0 |
| LEFT-TURN TYPE 2 | | 0 | 0 | 0 | 0 | 1 | 0 | 0 | 2 |

T

STRAIGHT-AHEAD  STRAIGHT-AHEAD/RIGHT-TURN

STRAIGHT-AHEAD/LEFT-TURN  STRAIGHT-AHEAD

RIGHT/LEFT-TURN  RIGHT-TURN

LEFT-TURN  RIGHT/LEFT-TURN

RIGHT-TURN TYPE 2  RIGHT-TURN

LEFT-TURN  LEFT-TURN TYPE 2

| AP | APPLICATION PROGRAM | THRESHOLD VALUES OF VEHICLE LANE ACCURACY |
|---|---|---|
| AP1 | DISPLAY PROGRAM | 0 |
| AP2 | MAP MATCHING PROGRAM | — |
| AP3 | ROUTE SEARCH PROGRAM | 1/2 |
| AP4 | ROUTE GUIDANCE PROGRAM | 1/2 |
| AP5 | SEARCH PROGRAM | — |
| AP6 | VEHICLE CONTROL SUPPORT PROGRAM | 1 |

LANE DETERMINING DEVICE, LANE DETERMINING METHOD AND NAVIGATION APPARATUS USING THE SAME

TECHNICAL FIELD

The present invention relates to a lane determining device, a lane determining method and a navigation apparatus using the same for determining the vehicle lane of a road in which a vehicle is traveling ("travel lane").

BACKGROUND ART

In recent years, there is known a lane determining device determining a vehicle lane of a road in which a vehicle is traveling, based on various kinds of information obtained from inside and outside of the vehicle, for appropriately conducting route guidance in a navigation apparatus, and the like. As an example of such a lane determining device, Japanese Patent Application Publication No. JP-A-2006-162409 discloses a structure in which the travel lane location is specified based on optical beacon information from a vehicle information processing device such as Vehicle Information and Communication System (VICS), estimation information from a current position managing section, events from a driver's input information managing section such as steering information and indicator information, a number of recognized lanes from an image recognizing device, the travel lane position among the recognized lanes, a position in the lane (positioned in the right direction or left direction in the lane), an increased/decreased number of lanes, directions of increased/decreased lanes, road shoulder information (presence/absence, and the like), a crossing state (lane or white line is crossed or not, and the like), information on road markings (paint), and so on, and its determination result is output. Further, regarding specification of the travel lane position using the information on the road makings, there is disclosed a structure in which the travel lane position is specified by comparing image recognition results of the road markings such as arrows designating a traffic section by the direction of travel with each lane such as a straight-ahead arrow, a right/left-turn arrow, and the like, and a pedestrian crossing, and so on, with information on feature types, feature positions, and the like, of features obtained from a database.

DISCLOSURE OF THE INVENTION

Problems to be Solved by the Invention

A determination of the travel lane can be conducted by performing image recognition processing of road markings such as arrows designating a traffic section by direction of travel within each lane, and by comparing image recognition results with information on feature types and feature positions of the road markings obtained from a database. At this time, when the feature types of the road markings provided on each of a plurality of lanes of a road on which the vehicle is traveling differ between lanes, and further, when the feature types of the road markings can be accurately recognized by the image recognition processing, the possibilities for the travel lane can be narrowed down to one. However, in reality, some roads have a plurality of lanes on which features of the same feature type are provided. Regarding such a road, it is impossible to specify which of the plurality of lanes on which the features of the same feature type are provided is the travel lane, and the possibilities can not be narrowed down to one. Further, the feature types may not be recognized accurately by the image recognition processing when the features have partially faded, and the like. In such a case, there is a possibility of falsely recognizing the feature type, resulting in a lane which is not the actual travel lane being specified as the travel lane.

The present invention was made in view of the above problems, and an object thereof is to provide a lane determining device which determines a travel lane based on results of image recognition of a feature existing in a lane where a vehicle is traveling, in particular, which is capable of, even if the vehicle lanes can not be narrowed down to one or the image recognition results are wrong, appropriately determining the vehicle lane by reflecting such situations.

Means for Solving the Problems

In order to attain the above object, a lane determining device according to the present invention includes: an image information obtaining unit for obtaining image information captured by an imaging device mounted on a vehicle; a vehicle position information obtaining unit for obtaining vehicle position information indicating a current position of the vehicle; a feature information obtaining unit for obtaining, when a road on which the vehicle is traveling has a plurality of lanes, feature information including feature types for target features on the respective lanes of the road in the traveling direction of the vehicle, based on the vehicle position information; an image recognizing unit for image recognition processing of the obtained image information to recognize a feature of the type of the target feature on a traveled lane in which the vehicle is traveling; and a lane accuracy determining unit for determining a vehicle lane accuracy value indicating a level of probability of being the traveled lane, for each of the respective lanes of the road on which the vehicle is traveling. In the lane determining device, the lane accuracy determining unit determines a recognition coefficient for each of the respective lanes, based on the type of the feature recognized as a result of the image recognition processing by the image recognizing unit and the feature type of the target feature of the respective lanes included in the feature information obtained by the feature information obtaining unit, each recognition coefficient indicating a level of probability that the feature type of the target feature has been recognized as the type of the recognized feature by the image recognition processing, and sets, as a vehicle lane accuracy value for each lane, a ratio of the recognition coefficient for the lane to the sum of the recognition coefficients of all the lanes of the road on which the vehicle is traveling.

In use of the above-described device, the vehicle lanes are not narrowed down to one, but a vehicle lane accuracy value indicating the level of probability of being the traveled lane is determined for each of the respective lanes of the road on which the vehicle is traveling, so that even when the vehicle lanes can not be narrowed down to one, or the image recognition determination is wrong, it is possible to appropriately determine the vehicle lane by reflecting such possibilities.

The lane accuracy determining unit preferably includes, a recognition table defining recognition coefficients for relationships between a plurality of feature types capable of being recognized as the type of a target feature by the image recognizing unit and determines the level of probability that each type of the target features of the respective lanes is the type of the feature recognized by the image recognition processing, by applying the type of the recognized feature to the recognition table to obtain the recognition coefficients for all lanes of the road on which the vehicle is traveling.

With this structure, by referring to the recognition table, it is possible to appropriately determine the level of probability that the feature type of the target feature of the respective lanes of the road on which the vehicle is traveling has been recognized as the type of the feature recognized by the image recognition processing, as the recognition coefficients. Further, by using thus determined recognition coefficients, it is possible to appropriately determine the vehicle lane accuracy.

Further, the recognition table preferably classifies each of the plurality of feature types capable of being a target feature of the type of the recognized feature as being within one of three different classes including feature types the same as the type of the recognized feature, feature types that may be falsely recognized as the type of the recognized feature by the image recognition processing, and feature types having no possibility of being falsely recognized as the type of the recognized feature by the image recognition processing, and defines a common value as the recognition coefficient for each of the feature types within the same class.

Further, when a part of the form of the feature of the feature type that may be falsely recognized as the type of the recognized feature by the image recognition processing cannot be image-recognized, that feature type is preferably classified different from the type of the recognized feature which can be recognized.

With this structure, it is possible to appropriately target a feature type that may be falsely recognized as the type of the recognized feature, to thereby define the recognition coefficient, allowing for partial fading, and the like of the feature, when the target feature in the vehicle lane to be a target of the image recognition processing is provided on a surface of the road.

Further, preferably, the feature capable of being the target feature is an arrow-shaped road marking designating a traveling direction for a lane and provided on the surface of a road.

Generally, an arrow-shaped road marking designating a traveling direction for each lane is often provided on each of a plurality of lanes of a road, the marking being in parallel at substantially the same positions in the traveling direction. Accordingly, such markings provide a high probability that the feature type of the target feature of the respective lanes of the road where the vehicle is traveling, which is included in the feature information, can be appropriately obtained for the plurality of lanes of the road on which the vehicle is traveling.

Further, it is preferable to further include a vehicle lane information generating unit for generating vehicle lane information in which a position of the vehicle lane among the plurality of lanes of the road where the vehicle is traveling is expressed by vehicle lane accuracy values for the respective lanes.

By outputting such generated vehicle lane information to a navigation apparatus, a vehicle control device and the like, for example, it becomes possible to utilize the information on the vehicle lane accuracy as a result of determination by the lane determining device, for a guidance operation, for vehicle control, and the like, performed by the navigation apparatus.

A navigation apparatus according to the present invention includes the lane determining device provided with the above-described respective structures; a map database storing map information including the feature information; an application program operating by utilizing the map information and the information on the vehicle lane accuracy determined by the lane determining device; and a guidance information output unit for operating according to the application program to output guidance information.

Accordingly, operations of respective guidance functions such as route search, route guidance, and display of a vehicle lane can be performed properly based on the vehicle lane accuracy of the respective lanes of the road on which the vehicle is traveling, as determined by the lane determining device.

Here, preferably, the application program has a plurality of functions, and performs operations of respective functions using the information for lanes the vehicle lane accuracy value equal to or larger than a threshold value determined according to the respective functions.

With this structure, it is possible to execute the functions such as route search, route guidance and the like, for example, for which a relatively high accuracy of results of the vehicle lane determination is required, and to execute the functions such as display of the vehicle lane, for example, for which the accuracy of the results of the vehicle lane determination need not be so high, using information even including one with low vehicle lane accuracy. Therefore, it is possible to execute each of the plurality of functions of the application program by appropriately using the information for the vehicle lane accuracy, whereby the results of determination by the lane determining device can be more effectively utilized.

The present invention also provides a table for determining a level of accuracy for each type of feature which can be recognized by image recognition processing in captured image information as a predetermined target feature, which table defines recognition coefficients indicating a level of probability for each of the plurality of feature types being recognized as the type of the recognized feature by the image recognition processing.

A lane determining method according to the present invention includes: obtaining image information captured by an imaging device mounted on a vehicle; obtaining vehicle position information indicating a current position of the vehicle; obtaining, when a road on which the vehicle is traveling has a plurality of lanes, feature information including feature types for target features on the respective lanes, in the traveling direction of the vehicle, based on the vehicle position information; conducting image recognition processing of the obtained image information to recognize a feature type of the target feature on the traveled lane; and determining a vehicle lane accuracy value indicating a level of probability of being the traveled lane, for each of the respective lanes of the road on which the vehicle is traveling. In the lane determining method, the lane accuracy value determining step determines the vehicle lane accuracy for the respective lanes based on the type of feature recognized by the image recognition processing and feature types of the target features of the respective lanes given in the feature information obtained by the feature information obtaining step, in accordance with the level of probability that the feature type of the target feature of the respective lanes has been recognized as the type of the feature recognized by the image recognition processing.

BRIEF DESCRIPTION OF THE DRAWINGS

FIG. 4 is a view showing an example of a recognition table T according to the embodiment of the present invention;

BEST MODES FOR CARRYING OUT THE INVENTION

Figure 1:
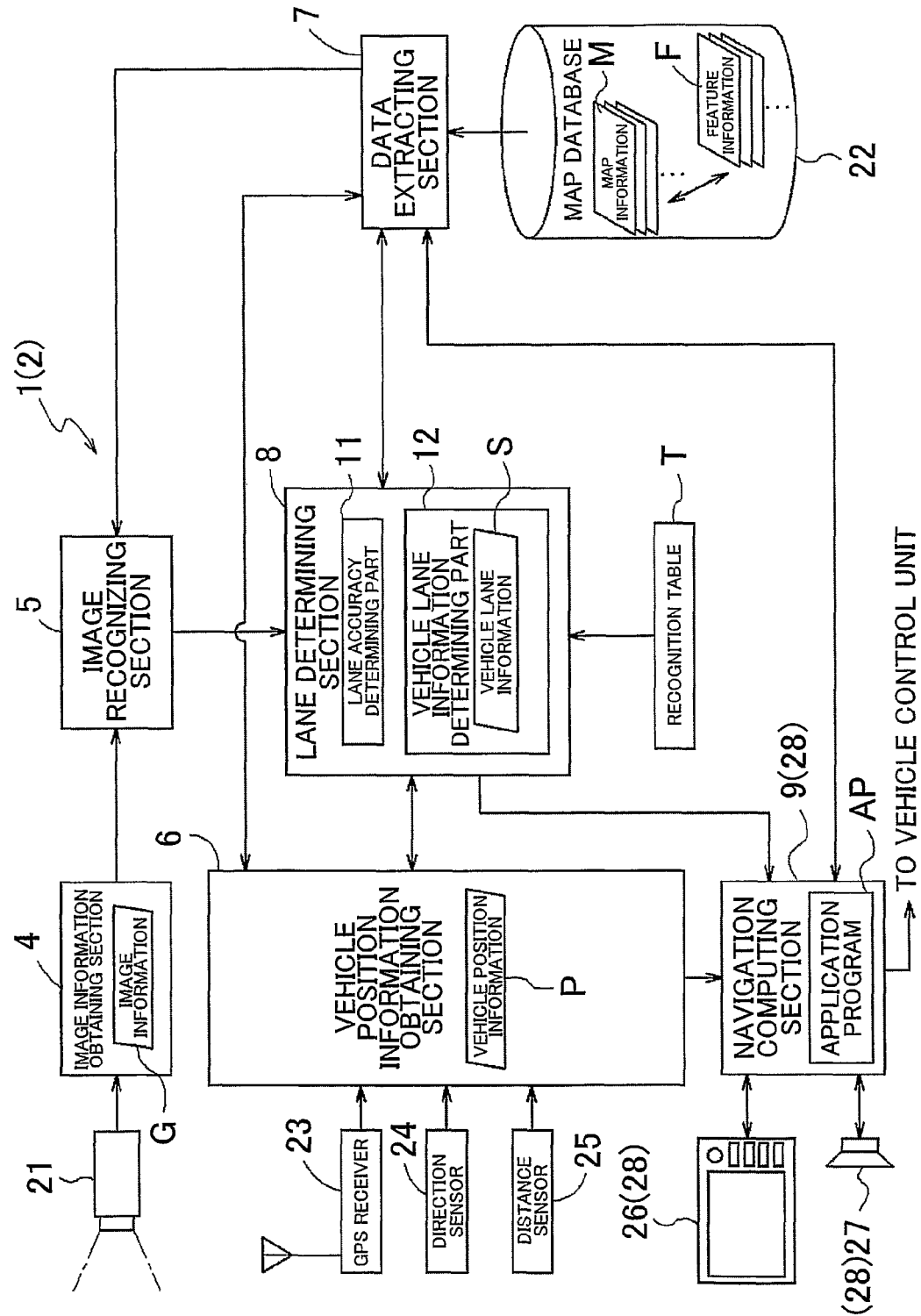
FIG. 1 is a block diagram showing a schematic structure of a navigation apparatus including a lane determining device according to an embodiment of the present invention.

An embodiment of the present invention will be explained based on the drawings. FIG. 1 is a block diagram showing a schematic structure of a navigation apparatus 1 including a lane determining device 2 according to the present embodiment. The lane determining device 2 determines a vehicle lane accuracy indicating a level of possibility of being the travel lane, for each lane of a road on which a vehicle 30 (refer to FIG. 3) is traveling (hereinafter, refer to as "traveled road"), based on image recognition results of image information G captured by an imaging device 21 mounted on the vehicle 30 and feature information F obtained from a map database 22. Accordingly, the lane determining device 2 generates vehicle lane information S by organizing results of determination of the vehicle lane accuracy. The navigation apparatus 1 performs predetermined navigation operations by referring to information on the vehicle lane accuracy of the respective lanes included in the vehicle lane information S.

Respective functional sections of the navigation apparatus 1 shown in FIG. 1, specifically, an image information obtaining section 4, an image recognizing section 5, a vehicle position information obtaining section 6, a data extracting section 7, a lane determining section 8, and a navigation computing section 9 are functional portions for applying various kinds of processing to input data, which are embodied as hardware or software (program), or as hardware and software, in a processor such as a CPU as a core member. Further, the map database 22 includes, as hardware, a device having a recording medium ("computer-readable medium") capable of recording information and its driving unit, such as, for example, a hard disk drive, a DVD drive including a DVD-ROM, or a CD drive including a CD-ROM. Hereinafter, the structures of the respective sections of the navigation apparatus 1 according to the present embodiment will be described in detail.

1. Map Database

Figure 2:
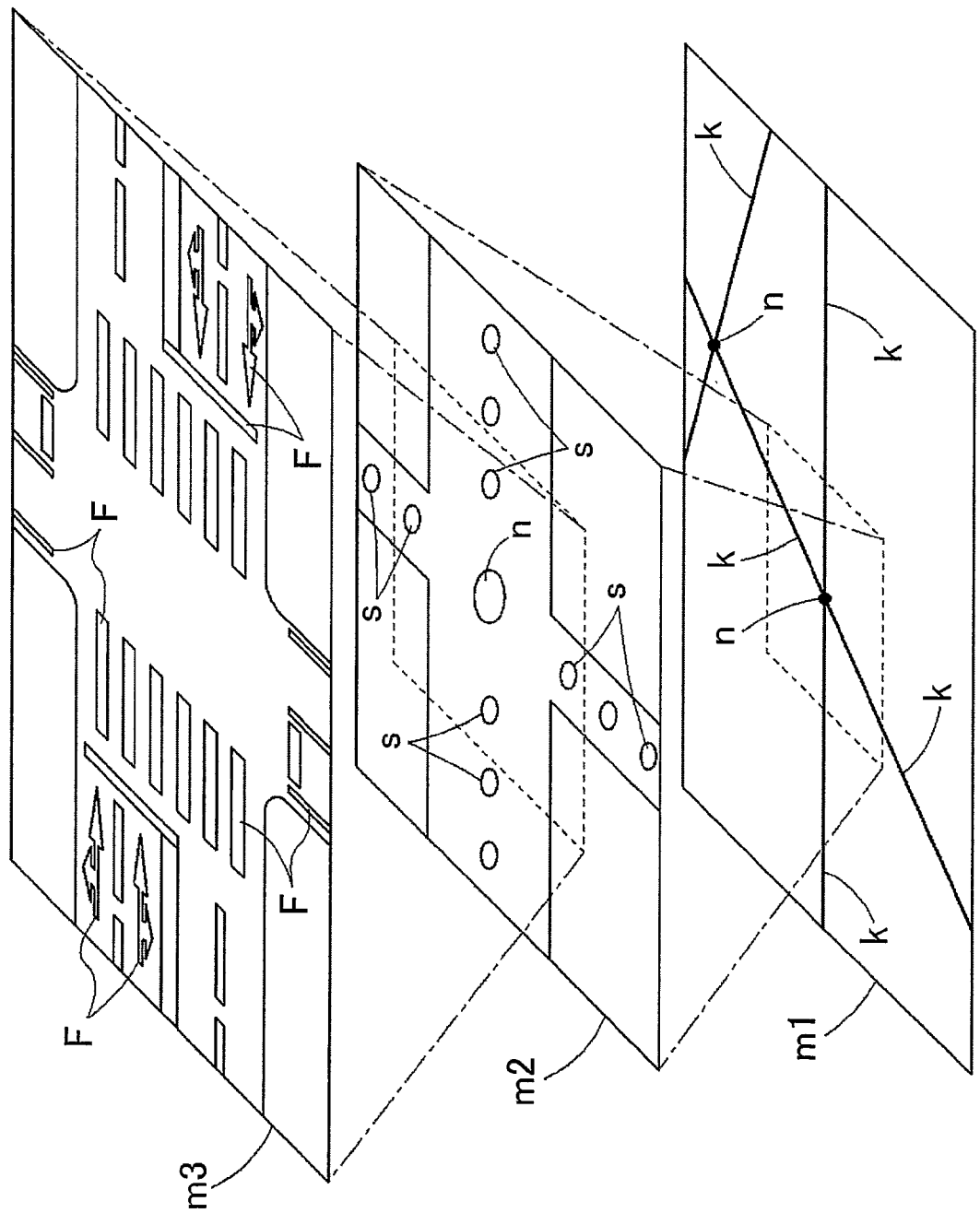
FIG. 2 is an explanatory diagram showing an example of a structure of map information and feature information stored in a map database.

The map database 22 stores map information M, which are classified on a per predetermined area basis, and a plurality of pieces of the feature information F corresponding to the map information M respectively. FIG. 2 is an explanatory view showing an example of the structure of the map information M and the feature information F which are stored in the map database 22. As shown in FIG. 2, the map database 22 stores data in a road network layer m1, a road shape layer m2, and a feature layer m3.

The road network layer m1 includes inter-road connection information. Specifically, the road network layer m1 includes: information on a large number of nodes n having map position information expressed by longitude and latitude; and information on a large number of links k, each linking two nodes n to form a road. Further, each of the links k has, as its link information, road type (type such as an expressway, a toll road, a national road, a prefecture road, or the like), and information on the length and the like of the link. Further, the road shape layer m2 is stored in correspondence to the road network layer m1 and shows the shape of each road. Specifically, the road shape layer m2 includes information on a large number of road shape interpolation points s which are disposed between the two nodes n (on the link k) and have the map position information expressed by longitude and latitude, information on road width, and so on. The map information M is composed of the pieces of information stored in the road network layer m1 and the road shape layer m2.

The feature layer m3 is formed in correspondence to the road network layer m1 and the road shape layer m2 and stores information on various kinds of features provided on a road or around the road, namely, the feature information F. The features for which the feature information F is stored in the feature layer m3 include road markings provided on a road surface. Examples of such features relating to the road markings include arrow-shaped road markings designating a traffic section by a traveling direction of each lane (hereinafter, simply refer to as "arrow markings"), specifically, a straight-ahead arrow, a straight-ahead/right-turn arrow, a straight ahead/left-turn arrow, a right-turn arrow, a left-turn arrow, a right/left-turn arrow, and so on. As will be described later, in the present embodiment, these arrow markings are features capable of being target features. Further, other than the above examples, for the features relating to the road markings, there included various kinds of painted markings such as a pedestrian crossing, a stop line, cross-shaped markings (cross mark, T-mark, and the like), lane markings provided along a road to demarcate each lane (a solid line, a dashed line, a dual line, and so on), a speed indication, and a zebra zone. Incidentally, the features for which the feature information F is stored may also include various kinds of features such as a traffic signal, a traffic sign, an overpass, a tunnel, and the like, in addition to the above road markings.

The feature information F includes, as its contents, position information, feature type information, form information, and attribute information regarding each feature. Here, the position information has information on the position of a representative point of each feature on a map (longitude and latitude) and the direction of each feature. The representative point of each feature is set at a center position in the length direction and in the width direction thereof. The feature type information indicates the type of each feature. Here, features with basically the same shapes are defined as one type of feature. Therefore, the feature type information indicates specific types of road markings such as a straight-ahead arrow, a right-turn arrow, a stop line, and a pedestrian crossing, for example. Further, the form information has information on the shape, size, color, and the like of each feature. The attribute information includes lane information indicating, when a road on which the respective feature is provided has a plurality of lanes, on which lane of the road the feature is provided. For example, when the feature is provided on a center lane of a three-lane road, the lane information is indicated as "2/3", and the like.

2. Image Information Obtaining Section

Figure 3:
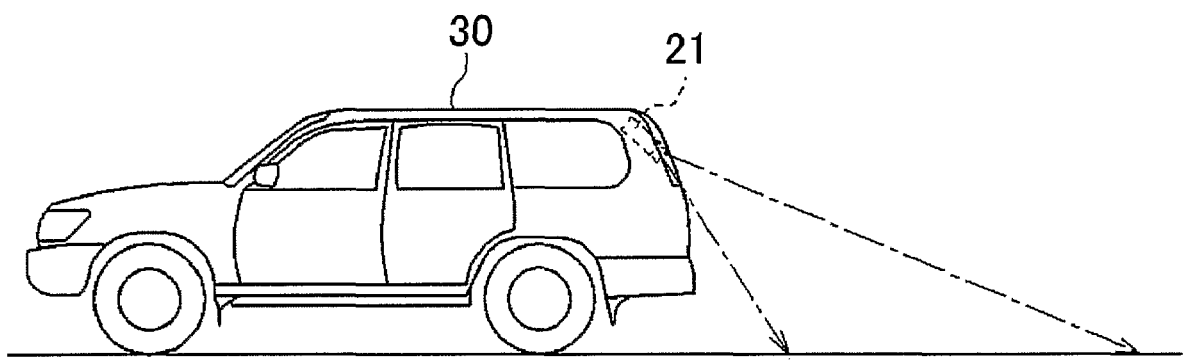
FIG. 3 is a view showing an example of a structure for disposing an imaging device on a vehicle.
Figure 5A:
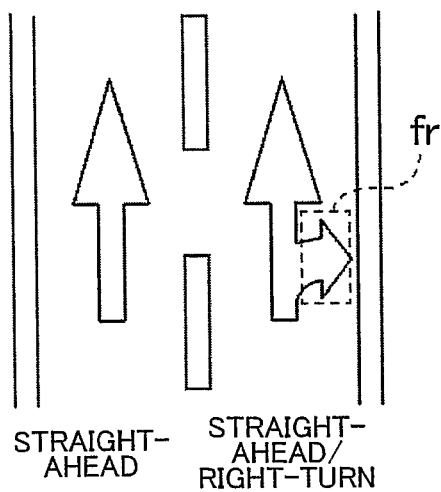
FIG. 5 shows views showing examples of combinations of two types of features that may be falsely recognized with each other.
Figure 5B:
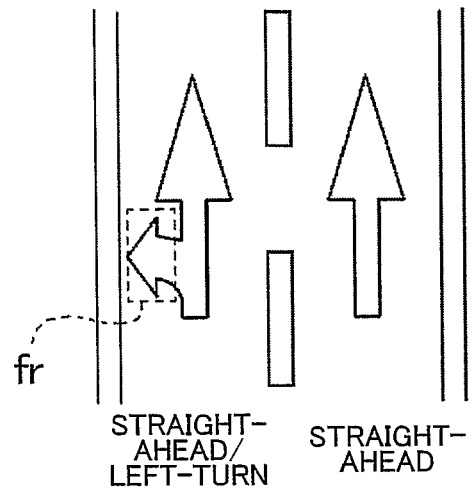
Figure 5C:
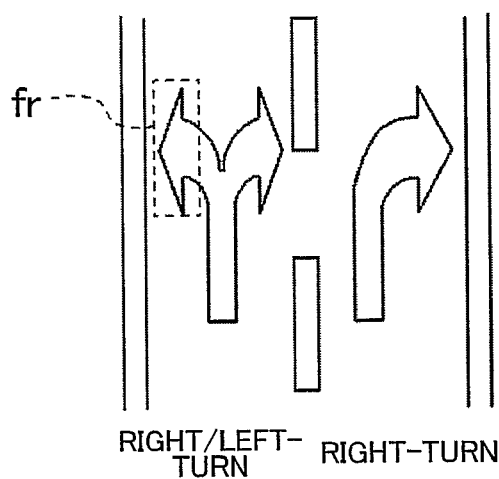
Figure 5D:
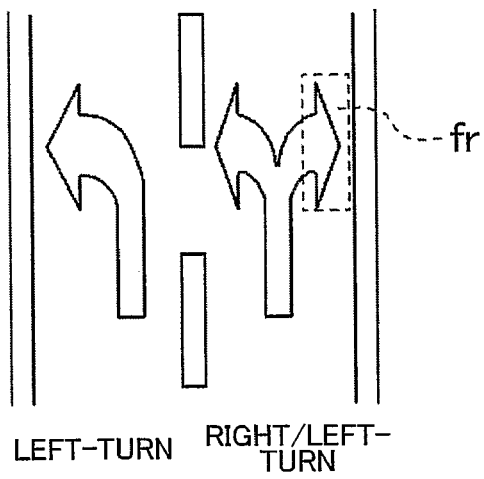
Figure 5E:
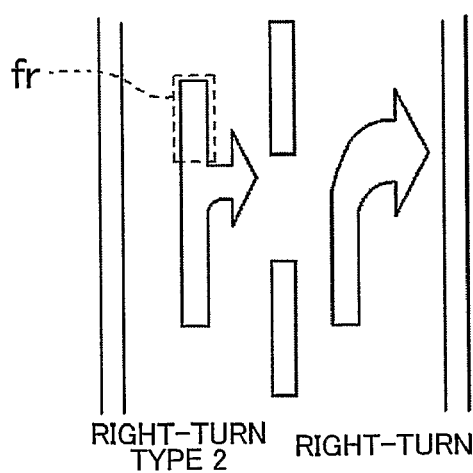
Figure 5F:
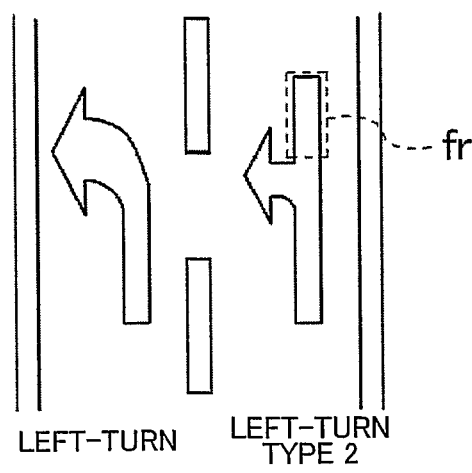

The image information obtaining section 4 functions as an image information obtaining unit for obtaining image information G regarding the vicinity of the vehicle position captured by the imaging device 21. Here, the imaging device 21 is an on-vehicle camera or the like including an imaging element, and is provided at a position where it is capable of capturing images of a surface of the road at least in the vicinity of the vehicle 30. As such an imaging device 21, a back camera capturing images of a surface of a road to the rear of the vehicle 30 as shown in FIG. 3 is suitably used, for instance. The image information obtaining section 4 receives analog image information captured by the imaging device 21 at predetermined time intervals and converts the analog image information into a digital signal to obtain the image information G. The time interval for receiving the image information G at this time can be set to about 10 ms to about 50 ms, for instance. Consequently, the image information obtaining section 4 is capable of continuously obtaining a plurality of frames of the image information G captured by the imaging device 21. The plural frames of the image information G obtained here are output to the image recognizing section 5.

3. Vehicle Position Information Obtaining Section

The vehicle position information obtaining section 6 functions as a vehicle position information obtaining unit for obtaining vehicle position information P indicating a current position of the vehicle 30. Here, the vehicle position information obtaining section 6 is connected to a GPS receiver 23, a direction sensor 24, and a distance sensor 25. Here, the GPS receiver 23 receives GPS signals from a Global Positioning System (GPS) satellite. The UPS signal is normally received every one second and is output to the vehicle position information obtaining section 6. The vehicle position information obtaining section 6 analyses the signals received by the GPS receiver 23 from the GPS satellite, thereby obtaining information regarding a current position (longitude and latitude), a traveling direction, a moving speed, and the like of the vehicle 30. The direction sensor 24 detects the traveling direction of the vehicle 30 or a change in the traveling direction. For example, the direction sensor 24 is formed by a gyro sensor, a geomagnetic sensor, an optical rotation sensor or a rotation-type variable resistor attached to a rotating portion of a steering handle, an angle sensor attached to a wheel portion, or the like. The direction sensor 24 outputs its detection result to the vehicle position information obtaining section 6. The distance sensor 25 detects a vehicle speed and a moving distance of the vehicle 30. For example, the distance sensor 25 is formed by a vehicle speed pulse sensor outputting a pulse signal every time a drive shaft, a wheel, or the like of the vehicle rotates a predetermined amount, a yaw/G sensor detecting acceleration of the vehicle 30, a circuit integrating the detected acceleration, and so on. The distance sensor 25 outputs information on the vehicle speed and the moving distance, which are its detection results, to the vehicle position information obtaining section 6.

The vehicle position information obtaining section 6 performs calculation for specifying the vehicle position by using a generally known method based on the outputs from the GPS receiver 23, the direction sensor 24, and the distance sensor 25. Further, the vehicle position information obtaining section 6 obtains the map information M regarding the vicinity of the vehicle position extracted from the map database 22 by the data extracting section 7, and based on the map information M, performs correction for overlaying the vehicle position on a road shown in the map information M by generally known map matching. In this manner, the vehicle position information obtaining section 6 obtains the vehicle position information P including the information on the current position of the vehicle 30, which is expressed by longitude and latitude, and the information on the traveling direction of the vehicle 30. Even with the vehicle position information P thus obtained, a vehicle lane which is a lane on which the vehicle 30 is traveling cannot be specified if a road where the vehicle 30 is traveling has a plurality of lanes. Therefore, the navigation apparatus 1 according to the present embodiment is structured to determine the vehicle lane in the later-described lane determining section 8. The vehicle position information P obtained by the vehicle position information obtaining section 6 is output to the data extracting section 7, the lane determining section 8, and the navigation computing section 9.

4. Data Extracting Section

The data extracting section 7 extracts necessary map information M and feature information F from the map database 22, based on the vehicle position information P and the like, obtained by the vehicle position information obtaining section 6. In the present embodiment, the data extracting section 7 extracts, when the traveled road has a plurality of lanes, the feature information F of a target feature existing in each lane of the traveled road in the traveling direction of the vehicle 30, based on the vehicle position information P, to thereby output the feature information F to the image recognizing section 5 and the lane determining section 8. Here, features to be target features are of the feature types that become targets of image recognition processing by the image recognizing section 5, and further, targets of lane accuracy determination processing by the lane determining section 8, which correspond to various kinds of arrow markings in the present embodiment, as will be described later. Therefore, in the present embodiment, the data extracting section 7 functions as a feature information obtaining unit in the present invention. Further, the data extracting section 7 extracts the map information M regarding the vicinity of the vehicle position used by the vehicle position information obtaining section 6 for the map matching, and outputs the map information M to the vehicle position information obtaining section 6. Further, the data extracting section 7 extracts the map information M of an area requested by the navigation computing section 9 for use in navigation processing, from the map database 22, and outputs the map information M to the navigation computing section 9.

5. Image Recognizing Section

The image recognizing section 5 functions as an image recognizing unit for performing image recognition processing of the image information G obtained by the image information obtaining section 4. In the present embodiment, the image recognizing section 5 performs the image recognition processing of the feature type of the target feature in the "travel lane", which is the lane where the vehicle 30 is traveling, by using the feature information F of the target feature extracted by the data extracting section 7. As described above, the feature information F of the target feature used here is a plurality of pieces of feature information F regarding the target feature existing in each lane in the traveling direction of the vehicle 30 when the traveled road has a plurality of lanes. Specifically, the image recognizing section 5 performs binarization processing, edge detection processing, and so on of the obtained image information G to extract contour information of the features (road markings) included in the image information G. Thereafter, the image recognizing section 5 extracts the contour information matching any of the forms shown in each of the plurality of pieces of form information on the target features included in the plurality of pieces of feature information F of the target features extracted by the data extracting section 7. Then, when such contour information is extracted, the feature type matching the contour information shown in the feature information F relating to the form information is recognized as the feature type of the target feature in the vehicle lane. The feature type of the target feature in the vehicle lane thus recognized by the image recognizing section 5 becomes the type of the recognized feature given in the image recognition results. Note that in this embodiment, by performing the image recognition processing as described above by using the feature information F of the target features extracted from the map database 22 by the data extracting section 7 based on the vehicle position information P, a feature type which can not be the target feature in the vehicle lane can be excluded from the image recognition results.

6. Recognition Table

FIG. 4 is a view showing an example of a recognition table T according to the present embodiment. As shown in the drawing, the recognition table T defines, for each of a plurality of feature types capable of being recognized by image processing as the target feature, recognition coefficients as weighting coefficients which indicate a level of probability of each of the plurality of feature types capable of being the target feature having been the type feature recognized in the image recognition processing by the image recognizing section 5. Schematically, the recognition table T is for determining a level of accuracy of the type of the feature recognized by the image recognition processing of the image data. Further, the recognition coefficients defined in the recognition table T indicate, based on the results of the image recognition, a possibility of accuracy in recognition of the type of the feature in the image recognition, by relationships between the types of the recognized feature and each of the plurality of feature types capable of being the target feature. In the example shown in the drawing, eight types of arrow markings, which are, a "straight-ahead arrow", a "straight-ahead/right-turn arrow", a "straight-ahead/left-turn arrow", a "right-turn arrow", a "left-turn arrow", a "right/left-turn arrow", a "right-turn type 2 arrow", and a "left-turn type 2 arrow" are the feature types capable of being the target feature. Then, the recognition table T defines, when each of the feature types of the eight kinds of arrow markings arranged in a vertical direction at the left side in the drawing becomes the target feature, the recognition coefficient indicating the level of probability that each of the feature types of the eight kinds of arrow markings arranged in a horizontal direction at the upper side in the drawing has been recognized as the type of the recognized feature, by using a two-dimensional matrix indicating mutual relationships among the feature types of the eight types of arrow markings.

Further, the recognition table T classifies the feature types of the eight kinds of arrow markings defining the recognition coefficients by a relationship with the type of the recognized feature, into three classifications, i.e. a first classification, a second classification, and a third classification, and defines a common value as a recognition coefficient for those feature types belonging to the same classification. Here, the first classification includes the feature type which the same as the type of the recognized feature. In this example, the recognition coefficient of the feature type belonging to the first classification is "2". The second classification includes the feature types that may be falsely recognized as the type of the recognized feature by the image recognition processing by the image recognizing section 5. In this example, the recognition coefficient of the feature type belonging to the second classification is "1". The third classification includes the feature types that have no possibility of being recognized as the type of the recognized feature by the image recognition processing by the image recognizing section 5. In this example, the recognition coefficient of the feature type belonging to the third classification is "0". Therefore, in the recognition table T, when the type of the recognized feature is the "straight-ahead arrow", for example, the recognition coefficient of the "straight-ahead arrow" belonging to the first classification, the recognition coefficients of the "straight-ahead/right-turn arrow" and the "straight-ahead/left-turn arrow" belonging to the second classification, and the recognition coefficients of the other feature types belonging to the third classification are respectively defined as "2", "1", and "0".

In the present embodiment, when a part of the form of the feature of the feature type belonging to the second classification that may be falsely recognized as one type of the recognized feature in the image recognition processing cannot be image-recognized, that feature type is characterized as different from the one type of feature which may be recognized. FIG. 5 shows views showing examples of such combinations of the two types of features that may be falsely identified with each other. FIG. 5A, FIG. 5B, FIG. 5C, FIG. 5D, FIG. 5E, and FIG. 5F respectively show a combination of the "straight-ahead arrow" and the "straight-ahead/right-turn arrow", the "straight-ahead arrow" and the "straight-ahead/left-turn arrow", the "right-turn arrow" and the "right/left-turn arrow", the "left-turn arrow" and the "right/left-turn arrow", the "right-turn arrow" and the "right-turn type 2 arrow", and the "left-turn arrow" and the "left-turn type 2 arrow". In each of these combinations, when a portion illustrated as a frame fr cannot be image-recognized, there is a chance that the two types of features consisting each combination are falsely identified with each other. As such a case where a part of the form of the feature of the feature type cannot be image-recognized, a case in which a contour of the feature cannot be extracted correctly at the time of the image recognition processing by the image recognizing section 5 due to a partial fading of the feature, and the like, is conceivable.

7. Lane Determining Section

The lane determining section 8 determines the vehicle lane accuracy indicating the level of possibility of being the vehicle lane in which the vehicle is traveling, for each of the respective lanes of the traveled road, based on the image recognition result of the image information G, the feature information F of the target feature extracted by the data extracting section 7, and the recognition table T, thereby generating the vehicle lane information S by organizing the results of its determination. Accordingly, in the present embodiment, the lane determining section 8 includes a lane accuracy determining part 11 and a vehicle lane information generating part 12. In the present embodiment, the lane accuracy determining part 11 consists of the "lane accuracy determining unit", and the vehicle lane information generating part 12 consists of the "vehicle lane information generating unit"

in the present invention. Note that the lane determining section 8 performs processing for determining the vehicle lane accuracy and generating the vehicle lane information S, only when the determination of the vehicle lane is necessary, that is, when the traveled road has a plurality of lanes in the traveling direction (one side), which is determined based on the vehicle position information P. Then, the lane determining section 8 outputs the vehicle lane information S as its determination result to the navigation computing section 9. Consequently, the navigation computing section 9 is capable of performing operations of guidance functions such as route guidance and route search by referring to the vehicle lane information S. Hereinafter, processing in the lane accuracy determining part 11 and the vehicle lane information generating part 12 included in the lane determining section 8 will be described in detail.

7-1. Lane Accuracy Determining Part

The lane accuracy determining part 11 determines the vehicle lane accuracy indicating the level of possibility of being the vehicle lane in which the vehicle is currently traveling for each of the respective lanes of the traveled road. At this time, the lane accuracy determining part 11 determines the vehicle lane accuracy for the respective lanes of the traveled road based on the feature type of the target feature in the vehicle lane recognized by the image recognition by the image recognizing section 5, and the feature type of the target feature of each of the respective lanes of the traveled road in the feature information F obtained by the data extracting section 7. Further, the lane accuracy determining part 11 determines the level of possibility (probability) that the feature type of the target feature of the respective lanes of the traveled road is recognized as the type of feature recognized in the image recognition processing, by using the recognition coefficients defined in the above-described recognition table T, to thereby determine, in accordance with the level of probability, image recognition of the target feature, the vehicle lane accuracy for the respective lanes of the traveled road.

More specifically, the lane accuracy determining part 11 first determines, based on the type of the recognized feature of the target feature in the vehicle lane obtained in image recognition by the image recognizing section 5, the feature type of the target feature of the respective lanes of the traveled road given in the feature information F obtained by the data extracting section 7, and the recognition table T, the recognition coefficient defined in the recognition table T by a relationship between the feature type of the recognized feature and each of the feature types of the target features of the respective lanes of the traveled road, as a recognition coefficient of the respective lanes of the traveled road. Then, a value corresponding to a ratio that the recognition coefficient of the respective lanes occupies with respect to the sum of recognition coefficients of all the lanes of the traveled road is set as the vehicle lane accuracy of the respective lanes of the traveled road. At this time, on which lane of the traveled road the target feature of the respective lanes of the traveled road given in the feature information F is provided, is decided by referring to the lane information (attribute information) included in the feature information F. Note that in the present embodiment, a value itself, indicating the ratio of the recognition coefficient of a lane to the sum of the recognition coefficients of all the lanes of the traveled road, is set as the vehicle lane accuracy for that lane.

Figure 6:
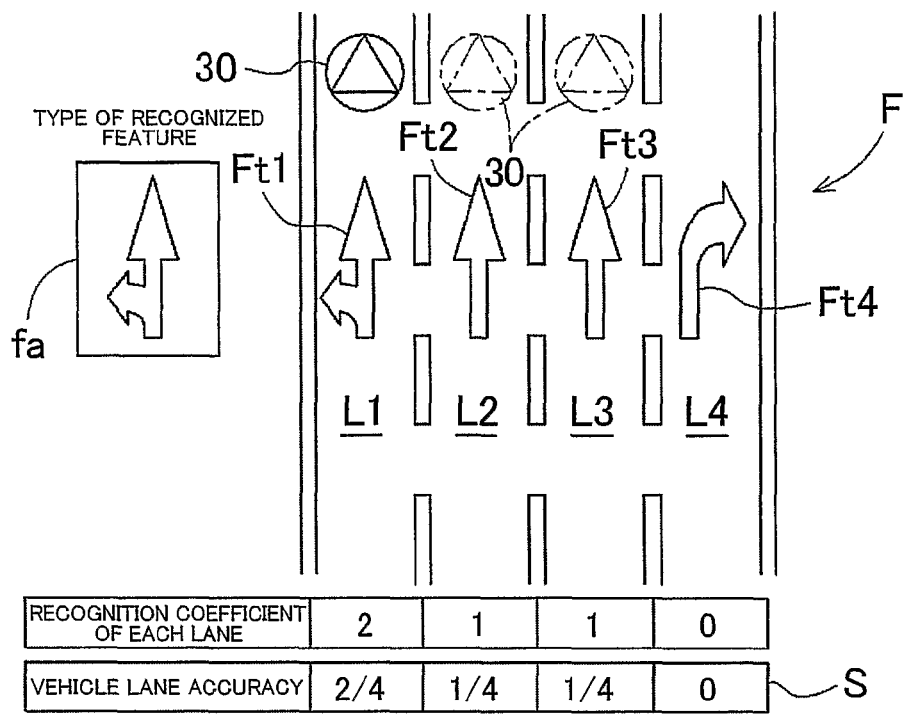
FIG. 6 is an explanatory diagram of a concrete example of a determination processing of a vehicle lane accuracy according to an embodiment of the present invention.
Figure 7:
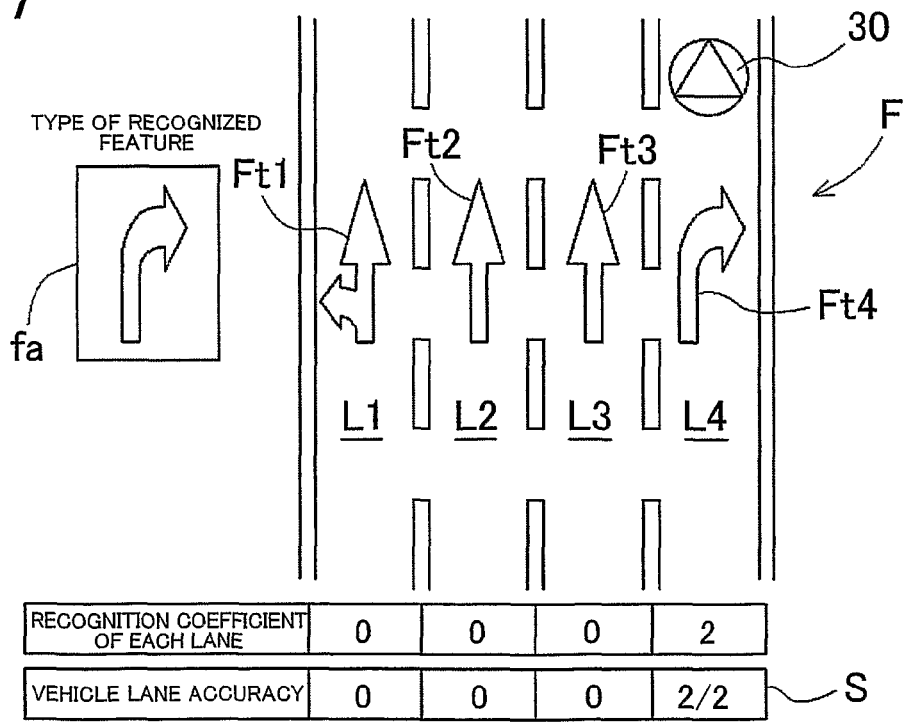
FIG. 7 is an explanatory diagram of a concrete example of the determination processing of the vehicle lane accuracy according to an embodiment of the present invention.

FIG. 6 and FIG. 7 provide specific examples of such vehicle lane accuracy determination processing by the lane accuracy determining part 11. In the respective drawings, a feature type framed by a quadrangular frame at the left side is the type of a recognized feature fa in the vehicle lane obtained as the result of the image recognition by the image recognizing section 5. Further, in the respective drawings, what are shown at the right side of the type of the recognized feature fa are feature types Ft1 to Ft4 of the target features of the respective lanes of the traveled road given in the feature information F obtained by the data extracting section 7. Furthermore, values framed by an upper frame at the lower side in the respective drawing are the recognition coefficients of the respective lanes, and values framed by a lower frame at the lower side in the respective drawing are the vehicle lane accuracy values of the respective lanes.

In the example shown in FIG. 6, regarding the feature type of the target feature of the respective lanes of the traveled road having four lanes, the feature information F obtained by the data extracting section 7 indicates the "straight-ahead/left-turn arrow", the "straight-ahead arrow", the "straight-ahead arrow", and the "right-turn arrow", as the feature type Ft1 of a target feature of a first lane L1, the feature type Ft2 of a target feature of a second lane L2, the feature type Ft3 of a target feature of a third lane L3, and the feature type Ft4 of a target feature of a fourth lane L4, respectively. Further, the type of the recognized feature fa of the target feature in the vehicle lane shown in the result of the image recognition by the image recognizing section 5 is the "straight-ahead/left-turn arrow". In this case, where the type of the recognized feature fa is the "straight-ahead/left-turn arrow", the lane accuracy determining part 11 refers to the third row from the top of the recognition table T in FIG. 4, to thereby determine the recognition coefficient defined by a relation between the type of the recognized feature fa and the "straight-ahead/left-turn arrow" being the feature type Ft1 of the target feature of the first lane L1, which is "2", as a recognition coefficient of the first lane L1. In like manner, the recognition coefficient "1" defined by a relationship with the "straight-ahead arrow" being the feature types Ft2 and Ft3 of the target features of the second lane L2 and the third lane L3 is set as a recognition coefficient of the second lane L2 and of the third lane L3, and the recognition coefficient "0" defined by a relation with the "right-turn arrow" being the feature type Ft4 of the target feature of the fourth lane L4 is determined as a recognition coefficient of the fourth lane L4. In this case, the sum of the recognition coefficients of all the lanes L1 to L4 of the traveled road is "4". Therefore, the ratio of the recognition coefficient "2" of the first lane L1 to the sum of recognition coefficients "2/4" is set as a vehicle lane accuracy of the first lane L1. Similarly, "1/4" being a ratio that is set for the recognition coefficient "1" of the second lane L2, "1/4" being a ratio that is set for the recognition coefficient "1" of the third lane L3, and "0" being a ratio that is set for the recognition coefficient "0" of the fourth lane L4.

Further, in the example shown in FIG. 7, the feature information F obtained by the data extracting section 7 is the same as that in the example shown in FIG. 6. Further, the type of the recognized feature fa of the target feature in the vehicle lane shown in the result of the image recognition by the image recognizing section 5 is the "right-turn arrow". In this case, where the type of the recognized feature fa is the "right-turn arrow", the lane accuracy determining part 11 refers to the fourth row from the top of the recognition table T in FIG. 4, to thereby determine the recognition coefficient defined by a relationship between the type of the recognized feature fa and the "straight-ahead/left-turn arrow" being the feature type Ft1 of the target feature of the first lane L1, which is "0", as the recognition coefficient of the first lane L1. In like manner, the recognition coefficient "0" defined by a relationship with the "straight-ahead arrow" being the feature types Ft2 and Ft3 of the target features of the second lane L2 and the third lane L3 is set as the recognition coefficient of the second lane L2 and of the third lane L3, and the recognition coefficient "2" defined by a relationship with the "right-turn arrow" being the feature type Ft4 of the target feature of the fourth lane L4 is determined as the recognition coefficient of the fourth lane L4. In this case, the sum of the recognition coefficients of all the lanes L1 to L4 of the traveled road is "2". Therefore, the recognition coefficient "2" of the fourth lane L4 gives the ratio "2/2", which is set as the vehicle lane accuracy of the fourth lane L4. If determined in the same manner, each of the vehicle lane accuracies of the first lane L1 to the third lane L3 becomes "0".

7-2. Vehicle Lane Information Generating Part

The vehicle lane information generating part 12 generates the vehicle lane information S in which the position of the travel lane among the plurality of lanes of the traveled road is expressed by the travel lane accuracy of the respective lanes of the traveled road determined by the lane accuracy determining part 11. Specifically, the vehicle lane information generating part 12 generates information in which the travel lane accuracy of all the lanes of the currently traveled road are organized by being correlated with an arrangement of the lanes of the traveled road, which organized information becomes the vehicle lane information S. For instance, in the example shown in FIG. 6, information in which the travel lane accuracy of the respective lanes of the traveled road are organized, that is, "first lane L1: 2/4, second lane L2: 1/4, third lane L3: 1/4, fourth lane L4: 0" framed by a lower frame at the lower side in the drawing is the vehicle lane information S. Although the vehicle lane information S indicates that the lane having the highest probability of being the lane in which the vehicle is traveling ("travel lane") is the first lane L1 (50%), as shown for the position of the vehicle 30 as a solid line in FIG. 6, it also indicates a possibility that the travel lane is the second lane L2 or the third lane L3, which are both 25%, as shown at the positions of the vehicle 30 expressed by dashed lines. Specifically, in the travel lane information S, the identification of the travel lane is not narrowed down to one, and the vehicle positions shown on the travel lanes are expressed according to the level of probability of each of the three lanes, among the four lanes, being the travel lane.

In the example shown in FIG. 7, "first lane L1: 0, second lane L2: 0, third lane L3: 0, fourth lane L4: 2/2" is the vehicle lane information S. The vehicle lane information S indicates that the probability of the fourth lane L4 being the travel lane is 100%, as shown by the position of the vehicle 30 expressed by a solid line in FIG. 7. Specifically, the travel lane information S identifies the travel lane as the fourth lane L4.

8. Navigation Computing Section

The navigation computing section 9 is a computation processing unit for operating mainly in accordance with an application program AP for executing the guidance functions of the navigation apparatus 1. Here, the application program AP operates by referring to the vehicle position information P obtained by the vehicle position information obtaining section 6, the map information M extracted by the data extracting section 7, the vehicle lane information S generated by the lane determining section 8, and so on. Further, in the present embodiment, the navigation computing section 9 is connected to a display/input device 26 and a voice output device 27. The display input device 26 is a device such as a liquid crystal display device integrated with a touch panel. Further, the voice output device 27 is in the form of a speaker or the like. In the present embodiment, the navigation computing section 9, the display input device 26 ("display device"), and the voice output device 27 function as a guidance information output unit 28 in the present invention. Further, the navigation computing section 9 is also connected to a not-shown vehicle control unit.

Figures 8, 9:
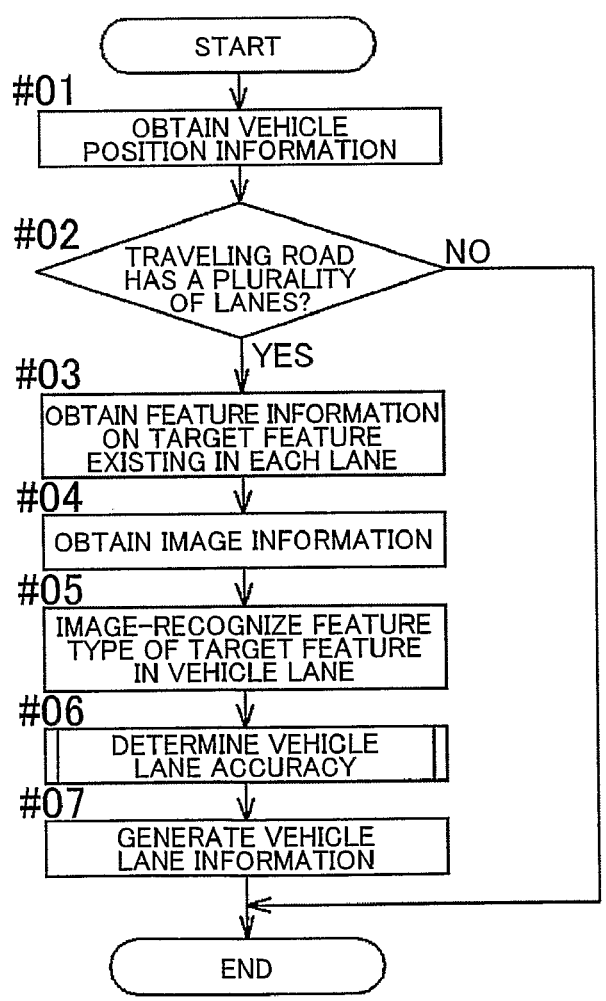
FIG. 8 is a view showing an example of threshold values of the vehicle lane accuracy previously determined in accordance with a structure and respective function programs of an application program.
FIG. 9 is a flowchart showing a procedure for the whole processing of a lane determining method according to an embodiment of the present invention.

FIG. 8 is a view showing a structure of the application program AP. As shown in the drawing, the application program AP has a plurality of subroutines providing various functions, here, a display program AP1, a map matching program AP2, a route search program AP3, a route guidance program AP4, a search program AP5, and a vehicle control support program AP6. Here, the display program AP1 is for displaying a map of the vicinity of the vehicle location, a destination and the like, on a display screen of the display/input device 26, displaying the vehicle position on the map, and the like. The map matching program AP2 is for map matching processing in which the vehicle location given by the vehicle position information P obtained by the vehicle position information obtaining section 6 is overlaid (superimposed) on a road included in the map information M extracted by the data extracting section 7. The route search program AP3 is for searching for a guidance route from, for instance, a departure place such as the current vehicle location to a destination input through the display/input device 26, and the like. The route guidance program AP4 is for providing appropriate route guidance to a user along the route to the destination determined by the route search program AP3, using a guidance display on the display screen of the display/input device 26, voice guidance by the voice output device 27, and the like. The search program AP5 is for searching for the destination, places to be displayed on the map, and the like, based on addresses, telephone numbers, names of facilities, categories, and so on. The vehicle control support program AP6 is for outputting necessary information such as the vehicle lane information S and the vehicle position information P to the not-shown vehicle control unit, to thereby support the vehicle control performed by the vehicle control unit.

Further, the information for vehicle lane accuracy having a value equal to or larger than a threshold value, determined according to the respective function programs AP1 to AP6, is used in operation of each of the plurality of function programs AP1 to AP6 included in the application program AP by referring to the vehicle lane information S generated by the lane determining section 8. In the column at the right side of the respective function programs AP1 to AP6 in FIG. 8, an example of the threshold values of the vehicle lane accuracy previously determined for the respective function programs AP1 to AP6 is shown. Here, the threshold values of the vehicle lane accuracy are set according to the level of accuracy of the vehicle lane information S required for each of the respective function programs AP1 to AP6. Specifically, a higher threshold value of the vehicle lane accuracy is set for a program among the function programs AP1 to AP6 which requires a higher accuracy of the vehicle lane information S. Accordingly, it becomes possible for each of the function programs AP1 to AP6 to operate by using appropriate information for the vehicle lane accuracy, whereby the results of determination by the lane determining device are effectively utilized. Note that the level of accuracy of the vehicle lane information S described here means a level of accuracy of the results of the vehicle lane determination.

In this example, since the vehicle control support program AP6 for vehicle control requires the highest level of accuracy for the vehicle lane information S, the threshold value is set to "1". Accordingly, the vehicle lane information is used for the vehicle control only when the possibilities for the travel lane are narrowed down to one. Further, the route search program AP3 and the route guidance program AP4 require a relatively high level of accuracy of the vehicle lane information S, so that the threshold values are set to "1/2". Accordingly, the vehicle lane information is used for the route search and the route guidance only when the travel lane is specified relatively accurately. A high level of accuracy of the vehicle lane information S is not required for the display program AP1 since it just displays the position of the travel lane on the display/input device 26, so that the threshold value is set to "0". Accordingly, the display of the travel lane position is performed regardless of the level of the travel lane accuracy. As a display method in this case, when the traveled road has four lanes and three lanes among them have the possibility of being the travel lane, it is possible to display the vehicle position in each of the three lanes, as shown in the example in FIG. 6, for instance. Further, at this time, it is preferable to provide different displays of the vehicle lane position such that it becomes more emphasized as the vehicle lane accuracy becomes higher, for instance. Note that in this example, the map matching program AP2 and the search program AP5 do not use the vehicle lane information S, so that no threshold value for the vehicle lane accuracy is set.

9. Lane Determining Method

Figure 10:
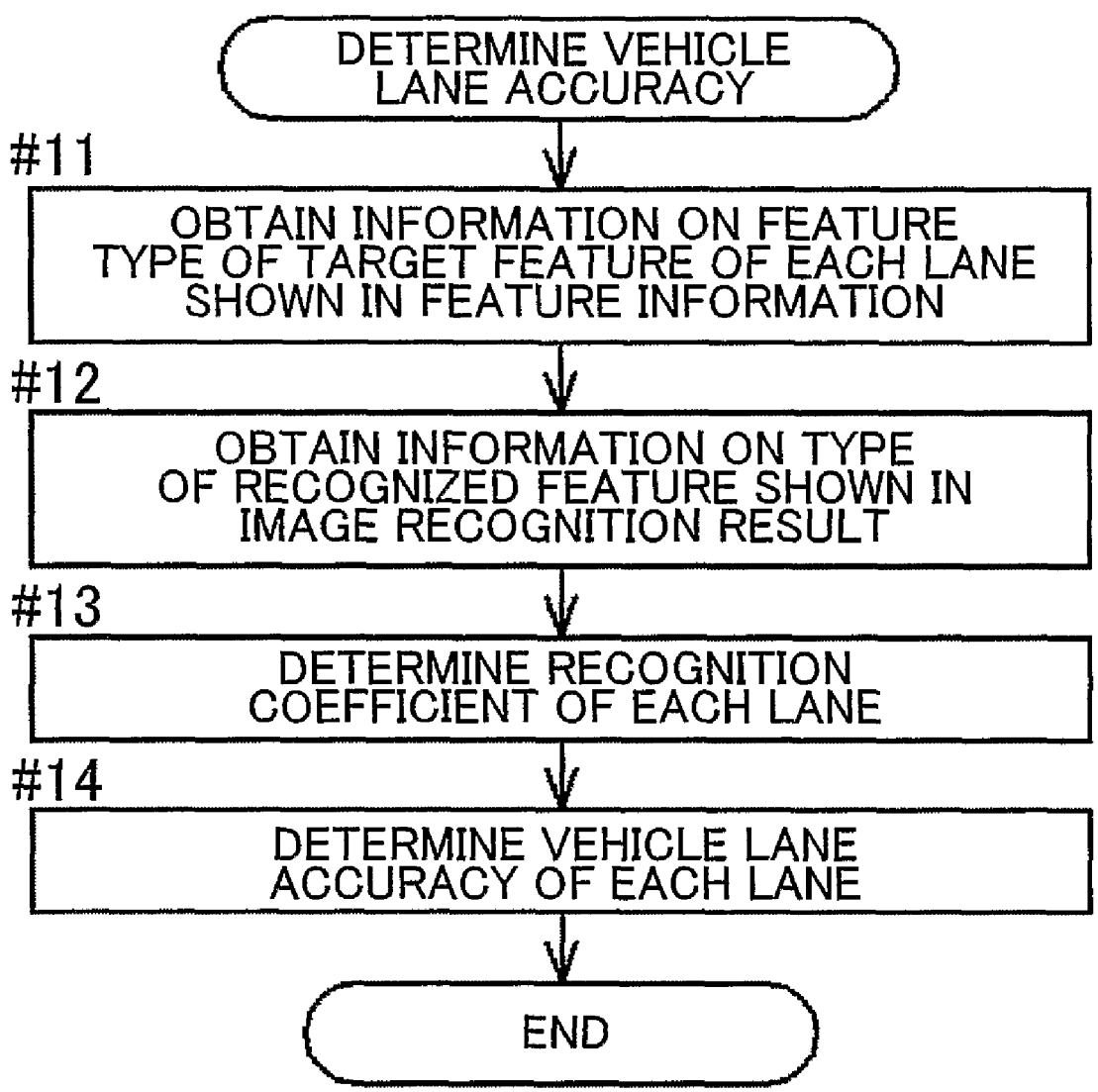
FIG. 10 is a flowchart showing a procedure for detailed processing of a lane accuracy determining method according to an embodiment of the present invention.

Next, the lane determining method executed in the navigation apparatus 1 including the lane determining device 2 according to the present embodiment will be described. FIG. 9 is a flowchart showing the procedure for the whole processing of the travel lane determining method according to the present embodiment, and FIG. 10 is a flowchart showing the procedure for detailed processing of the lane accuracy determining method according to the present embodiment.

As shown in FIG. 9, when determining the travel lane, in the navigation apparatus 1, the vehicle position information obtaining section 6 first obtains the vehicle position information P (Step #01). Next, based on the vehicle position information P obtained in the Step #01, the data extracting section 7 determines whether or not the traveled road has a plurality of lanes, by referring to either or both of the map information M and the feature information F regarding the vicinity of the vehicle position stored in the map database 22 (Step #02). Then, when the traveled road does not have a plurality of lanes (Step #02: NO), specifically, when it is a one-lane road, since no determination of the vehicle lane is needed, the processing is ended here.

When the traveled road does have a plurality of lanes (Step #02: YES), the data extracting section 7 extracts the feature information F for the target feature existing in each lane of the traveled road in the traveling direction of the vehicle 30 from the map database 22, to thereby obtain the feature information F (Step #03). Further, the image information obtaining section 4 obtains the image information G captured by the imaging device 21 mounted on the vehicle 30 (Step #04). Next, the image recognizing section 5 performs the image recognition processing of the feature type of the target feature for the vehicle lane which the vehicle 30 is traveling (Step #05). Then, the lane accuracy determining part 11 of the lane determining section 8 determines the vehicle lane accuracy which indicates the level of probability of each lane being the travel lane (Step #06). The method of determining the vehicle lane accuracy will be described later in detail based on the flow chart of FIG. 10. Thereafter, the vehicle lane information generating part 12 of the lane determining section 8 generates the vehicle lane information S in which the position of the travel lane among the plurality of lanes of the traveled road is expressed as the vehicle lane accuracy for each of the respective lanes of the traveled road determined in the Step #06 (Step #07). The travel lane determining routine is then ended.

Next, details of the processing of the lane accuracy determining routine of Step #06 will be explained. As shown in FIG. 10, the lane accuracy determining part 11 first obtains, based on the feature information F for the target features existing in the respective lanes of the traveled road in the traveling direction of the vehicle 30 obtained in the Step #03, the information including the feature type of the target features of the respective lanes of the traveled road included in the feature information F (Step #11). This processing is performed by reading out the feature type information included in the respective feature information F obtained in the Step #03. Next, the lane accuracy determining part 11 obtains the information on the type of the feature recognized in the image recognition by the image recognition processing in the Step #05 (Step #12).

Thereafter, the lane accuracy determining part 11 determines the recognition coefficient for each of the respective lanes of the traveled road, based on the information on the feature type of each of the target features of the respective lanes of the traveled road obtained in the Step #11, the information on the type of the recognized feature obtained in the Step #12, and the recognition table T (Step #13). As described above, the recognition coefficients of the respective lanes of the traveled road can be determined from the recognition coefficients given in the recognition table T based on relationships between the type of the recognized feature and the feature types of the target features of the respective lanes of the traveled road. Then, the vehicle lane accuracy for each of the respective lanes of the traveled road is determined based on the recognition coefficients for the respective lanes of the traveled road determined in Step #13 (Step #14). The vehicle lane accuracy of each of the respective lanes of the traveled road is the value corresponding to the ratio of the recognition coefficient of that lane to the sum of the recognition coefficients of all the lanes of the traveled road, as described above. Note that an explanation of a specific determination of such vehicle lane accuracy by the lane accuracy determining part 11 will be omitted here, since specific examples have already been described with reference to FIG. 6 and FIG. 7. Then, the routine of lane accuracy determination in Step #06 is ended.

9. Other Embodiments (1) The specific value of the recognition coefficient defined in the recognition table T in the above-described embodiment is just an example, and it is preferable to set an appropriate value corresponding to a recognition accuracy and the like of the feature type of the target feature in the travel lane in the image recognition processing. Further, in the above-described embodiment, the feature types capable of being recognized as the target feature are three in number; however, such feature types may also be, for example, two or four in number. Further, regarding the criteria for the classification of the plurality of feature types capable of being the target feature, the one explained in the above-described embodiment is just an example. Therefore, to further classify the feature types that may be falsely recognized as the type of the feature recognized in the image recognition processing into a plurality of levels according to the level of possibility of the false recognition, is also one of the preferred embodiments of the present invention. Further, the criteria at the time of the classification can differ from the criteria explained in the above-described embodiment.

(2) In the above-described embodiment, the case where the lane accuracy determining part 11 defines the value itself indicating the ratio that the recognition coefficient of the respective lanes occupies with respect to the sum of the recognition coefficients of all the lanes of the traveled road as the vehicle lane accuracy of the respective lanes of the traveled road, is described as an example. However, the vehicle lane accuracy can take any value as long as the value indicates the level of probability that the feature types of the target features of the respective lanes of the traveled road will be recognized as the type of the feature recognized by image recognition processing, so that a value determined by another method can also be defined as the vehicle lane accuracy. For instance, to define a value in which the ratio of the recognition coefficient of each of the respective lanes to the sum of the recognition coefficients of all the lanes is multiplied by a predetermined coefficient, as the vehicle lane accuracy, is also possible. Further, the recognition coefficients of the respective lanes of the traveled road, or values in which the recognition coefficient is multiplied by a predetermined coefficient can also be used as the vehicle lane accuracy.

(3) In the above-described embodiment, the arrow-shaped road markings (arrow markings) designating the traffic section by the traveling direction of the respective lanes are the features capable of being the target features. However, the features capable of being the target features are not limited to these, and as long as provided for each lane of a road having a plurality of lanes, features such as other road markings, and the like, can also be the target features.

(4) In the above-described embodiment, the structure where the vehicle lane information S in which the position of the travel lane among the plurality of lanes of the traveled road is expressed as the vehicle lane accuracy for each of the respective lanes of the traveled road is generated, and is output to the navigation computing section 9, is described as an example. However, instead of generation of such vehicle lane information S, a structure wherein the travel lane accuracy of the respective lanes of the traveled road is output, as information on the respective lanes, to an information output target such as the navigation computing section 9, is also one of the preferred embodiments of the present invention.

(5) Use of other lane determining methods together with the vehicle lane accuracy determination for the respective lanes of the traveled road according to the above-described embodiment is also one of the preferred embodiments of the present invention. For such other lane determining methods, for example, a method for determining a lane on which the vehicle is traveling based on a positional relationship between types of lane markings (types of lines such as a solid line, a dashed line, and a dual line) in the vicinity of the vehicle recognized in the image recognition processing, as well as the respective lane markings and the vehicle, and based on the feature information F of the lane markings in the vicinity of the vehicle position obtained from the map database 22, a method for determining the vehicle lane based on information from VICS, specifically, based on information from an optical beacon or the like sent from a transmitter provided for each lane of a road, and the like, can be applied.

(6) In the above-described embodiment, all of the components of the navigation apparatus 1 including the lane determining device 2 are described as mounted on the vehicle. However, the present invention is not limited to such a structure. Specifically, for example, a structure in which components other than the imaging device 21 are provided outside of the vehicle and connected via a communication network such as the Internet, in which a transmission/reception of information and signals are conducted via the network, to thereby form the lane determining device 2 and the navigation apparatus 1, is also one of the preferred embodiments of the present invention.

(7) In the above-described embodiment, the lane determining device 2 is described as used in the navigation apparatus 1 by way of example. However, the present invention is not limited to this, and it goes without saying that the lane determining device 2 can be used in conjunction with other devices, such as a travel control device of a vehicle.

The invention claimed is:

1. A lane determining device for determining a travel lane in which a vehicle is traveling, the device comprising:
    an image information obtaining unit for obtaining image information captured by an imaging device mounted on the vehicle;
    a vehicle position information obtaining unit for obtaining vehicle position information indicating a current position of the vehicle;
    a feature information obtaining unit for obtaining, when a road on which the vehicle is traveling has a plurality of lanes, feature information including feature types for target features on respective lanes of the road, in the traveling direction of the vehicle, based on the vehicle position information;
    an image recognizing unit for image recognition processing of the obtained information to recognize a feature of the type of the target feature on the travel lane; and
    a lane accuracy determining unit for determining a vehicle lane accuracy value indicating a level of probability of being the travel lane, for each of the respective lanes of the road on which the vehicle is traveling,
    wherein the lane accuracy determining unit determines a recognition coefficient for each of the respective lanes, based on the type of the feature recognized as a result of the image recognition processing by the image recognizing unit and the feature type of the target feature of the respective lanes included in the feature information obtained by the feature information obtaining unit, each recognition coefficient indicating a level of probability that the feature type of the target feature has been recognized as the type of the feature recognized by the image recognition processing, and sets, as a vehicle lane accuracy value for each of the respective lanes, a ratio of the recognition coefficient for the lane to the sum of the recognition coefficients of all the lanes of the road on which the vehicle is traveling.

2. The lane determining device according to claim 1, further comprising:
    a recognition table for defining recognition coefficients for relationships between a plurality of feature types capable of being recognized as the type of a target feature by the image recognizing unit and the type of the recognized feature, wherein
    the lane accuracy determining unit determines the level of probability that each of the types of the target features of the respective lanes is the type of the feature recognized by the image recognition processing, by applying the type of the recognized feature to the recognition table to obtain the recognition coefficients for all lanes, in the traveling direction of the vehicle, of the road on which the vehicle is traveling.

3. The lane determining device according to claim 2, wherein
    the lane accuracy determining unit applies the type of the recognized feature and, the feature types of the target features of the respective lanes to the recognition table, to obtain, for each lane, a recognition coefficient defined by a relationship between the type of the recognized feature and the feature type of the target feature of that lane.

4. The lane determining device according to claim 3, wherein
the recognition table classifies each of the plurality of feature types, capable of being a target feature of the type of the recognized feature, as being within one of three different classes including, respectively, feature types the same as the type of the recognized feature, feature types that may be falsely recognized as the type of the feature recognized by the image recognition processing, and feature types having no possibility of being recognized as the type of the feature recognized by the image recognition processing, and defines a common value as the recognition coefficient for each of the feature types within the same class.

5. The lane determining device according to claim 4, wherein
the feature type that may be falsely recognized as the type of the recognized feature by the image recognition processing is a feature which differs from the type of the recognized feature when a part of the form of the feature of the feature type cannot be image-recognized.

6. The lane determining device according to claim 2, wherein
the recognition table classifies, when each of the plurality of feature types capable of being a target feature is of the type of the recognized feature, as being within one of three different classes including, respectively, feature types the same as the type of the recognized feature, feature types that may be falsely recognized as the type of the recognized feature by the image recognition processing, and feature types having no possibility of being recognized as the type of the feature recognized by of the image recognition processing, and defines a common value as the recognition coefficient for each of the feature types within the same class.

7. The lane determining device according to claim 6, wherein
the feature type that may be falsely recognized as the type of the recognized feature by the image recognition processing is a feature which differs from the type of the recognized feature, when a part of the form of the feature of the feature type cannot be image-recognized.

8. The lane determining device according to claim 1, wherein
the target feature is an arrow-shaped road marking within a lane designating a traveling direction for that lane.

9. The lane determining device according to claim 1, further comprising:
a vehicle lane information generating unit for generating vehicle lane information in which a position of the travel lane relative to the other lanes of the road on which the vehicle is traveling is expressed by the vehicle lane accuracy for each of the respective lanes.

10. A navigation apparatus, comprising:
the lane determining device according to claim 1;
a map database storing map information including the feature information;
an application program operating by referring to the map information and the accuracy values for the lanes of the determined by the lane accuracy determining unit; and
a guidance information output unit for operating according to the application program to output guidance information.

11. The navigation apparatus according to claim 10, wherein
the application program has a plurality of functions, and performs operations of respective functions using information for lanes having vehicle lane accuracy values equal to or larger than a threshold value determined according to the respective functions.

12. The navigation apparatus according to claim 10, further comprising:
a display device for display of a map image showing the respective lanes of the road traveled by the vehicle based on the map information, wherein the navigation apparatus superimposes on each of a plurality of the respective lanes shown in the displayed map image, a vehicle position image indicative of the current position of the vehicle along the road, the vehicle position images differing from each other in accordance with different vehicle lane accuracy values.

13. A non-transitory, computer-readable medium encoded with a recognition table for use in identification of a travel lane in which a vehicle is traveling by determining a level of accuracy for each type of target feature which serves to identify a lane and which can be recognized by image recognition processing, wherein
the recognition table defines recognition coefficients for relationships between a plurality of the feature types capable of being recognized as a target feature by the image recognition processing, each of the recognition coefficients indicating a level of probability that each of the plurality of feature types is recognized as the type of the feature recognized by the image recognition processing.

14. The non-transitory, computer-readable medium encoded with a recognition table according to claim 13, wherein
the recognition table classifies each of the plurality of feature types capable of being a target feature of the type of the recognized feature, as being within one of three different classes including, respectively, feature types the same as the type of the recognized feature, feature types that may be falsely recognized as the type of the recognized feature by the image recognition processing, and feature types having no possibility of being falsely recognized as the type of the feature recognized by the image recognition processing, and defines a common value as the recognition coefficient for each of the feature types within the same class.

15. A lane determining method for determining a travel lane in which a vehicle is traveling, the method comprising the steps of:
obtaining image information captured by an imaging device mounted on the vehicle;
obtaining vehicle position information indicating a current position of the vehicle;
obtaining, when a road on which the vehicle is traveling has a plurality of lanes, feature information including feature types for target features on respective lanes of the road, in the traveling direction of the vehicle, based on the vehicle position information;
conducting image recognition processing of the obtained image information to recognize a feature type of the target feature on the travel lane;
determining a vehicle lane accuracy value indicating a level of probability of being the travel lane, for each of the respective lanes of the road on which the vehicle is traveling;

determining a recognition coefficient for each of the respective lanes, based on the type of the feature recognized as a result of the image recognition processing and the feature type of the target feature of the respective lanes included in the obtained feature information, each recognition coefficient indicating a level of probability that the feature type of the target feature has been recognized as the type of the feature recognized by the image recognition processing; and setting, as a vehicle lane accuracy value for each of the respective lanes, a ratio of the recognition coefficient for the lane to the sum of the recognition coefficients of all the lanes of the road on which the vehicle is traveling.

16. The lane determining method according to claim 15 further comprising:

displaying a map image showing the respective lanes of the road traveled by the vehicle; and superimposing, on each of the respective lanes shown in the displayed map image, a vehicle position image indicative of the current position of the vehicle along the road, the vehicle position images differing from each other in accordance with different vehicle lane accuracy values.

17. The lane determining method according to claim 15, wherein:

the level of probability that each of the target features of the respective lanes is the feature recognized by the image recognition processing is determined by applying the type of the recognized feature to a recognition table to obtain the recognition coefficients for all lanes, in the traveling direction of the vehicle, of the road on which the vehicle is traveling; and the recognition table defines recognition coefficients as relationships between a plurality of feature types capable of being recognized as the type of a target feature by the image recognition processing, and the type of the recognized feature.

18. The lane determining method according to claim 15, wherein:

the recognition table classifies each of the plurality of feature types, capable of being a target feature of the type of the recognized feature, as being within one of three different classes including, respectively, feature types the same as the type of the recognized feature, feature types that may be falsely recognized as the type of the recognized feature by the image recognition processing, and feature types having no possibility of being recognized as the type of the feature recognized by the image recognition processing, and defines a common value as the recognition coefficient for each of the feature types within the same class.

* * * * *

UNITED STATES PATENT AND TRADEMARK OFFICE
CERTIFICATE OF CORRECTION

| | |
|---|---|
| PATENT NO. | : 8,346,473 B2 |
| APPLICATION NO. | : 12/593772 |
| DATED | : January 1, 2013 |
| INVENTOR(S) | : Masaki Nakamura et al. |

It is certified that error appears in the above-identified patent and that said Letters Patent is hereby corrected as shown below:

Column 19, line 63 (claim 10, line 6), "lanes of the" should read --lanes--.

Signed and Sealed this
Nineteenth Day of February, 2013

Teresa Stanek Rea
*Acting Director of the United States Patent and Trademark Office*